United States Patent [19]
Toko

[11] Patent Number: 5,793,459
[45] Date of Patent: Aug. 11, 1998

[54] LIQUID CRYSTAL DISPLAY OF HORIZONTAL FIELD TYPE

[75] Inventor: Yasuo Toko, Machida, Japan

[73] Assignee: Stanley Electric Co., Ltd., Tokyo, Japan

[21] Appl. No.: 842,027

[22] Filed: Apr. 23, 1997

[30] Foreign Application Priority Data

Jan. 5, 1996 [JP] Japan .................... 8-110705

[51] Int. Cl.$^6$ ................. G02F 1/1337; G02F 1/133
[52] U.S. Cl. ............. 349/128; 349/129; 349/19; 349/191
[58] Field of Search ............ 349/128, 129, 349/139, 191, 19

[56] References Cited

U.S. PATENT DOCUMENTS

| | | | |
|---|---|---|---|
| 4,333,708 | 6/1982 | Boyd | 349/129 |
| 5,473,455 | 12/1995 | Koike | 359/76 |
| 5,477,356 | 12/1995 | Kobayashi et al. | 359/62 |
| 5,479,282 | 12/1995 | Toko et al. | 359/75 |
| 5,576,862 | 11/1996 | Sugiyama et al. | 359/75 |
| 5,600,464 | 2/1997 | Ohe | 349/19 |
| 5,671,033 | 9/1997 | Katagiri | 349/128 |
| 5,689,322 | 11/1997 | Hirata | 349/129 |
| 5,710,611 | 1/1998 | Suzuki | 349/129 |

*Primary Examiner*—William L. Sikes
*Assistant Examiner*—Tiep H. Nguyen
*Attorney, Agent, or Firm*—Frishauf, Holtz, Goodman, Langer & Chick

[57] ABSTRACT

A liquid crystal display element has: a pair of substrates facing each other; a liquid crystal layer sandwiched between the pair of substrates; a unit for applying an electric field to the liquid crystal layer, the electric field being substantially parallel to surfaces of the pair of substrates; and an alignment structure that an interface of one of the pair of substrates with the liquid crystal layer is not subjected to a positive alignment process and an interface of the other of the pair of substrates with the liquid crystal layer is subjected to the positive alignment process, wherein the alignment state of liquid crystal molecules of the liquid crystal layer is changed between directions both parallel to the surfaces of the pair of substrates. The liquid crystal display element of the horizontal electric field driving type is provided which is free of element deteriorations and breakages even under rubbing, excellent in the viewing angle characteristics and response characteristics, and can be driven at a low voltage.

17 Claims, 3 Drawing Sheets

LIQUID CRYSTAL DISPLAY OF HORIZONTAL FIELD TYPE

This application is based upon Japanese Patent Application HEI-8-110705 filed on May 1, 1996, the entire contents of which are incorporated herein by reference.

BACKGROUND OF THE INVENTION a) Field of the Invention

The present invention relates to a liquid crystal display element and its manufacture, and more particularly to a liquid crystal display element and its manufacture in which the alignment (or orientation) direction of liquid crystal molecules is controlled by a horizontal electric field parallel to the substrate surface.

b) Description of the Related Art

TN (twisted nematic) type liquid crystal elements and STN (supertwisted nematic) type liquid crystal elements are presently used for liquid crystal display devices. These TN type liquid crystal elements all adopt a display mode in which an alignment direction is changed from the state of liquid crystal molecules disposed along a horizontal direction (parallel to a substrate surface) to the state of molecules raised (tilted up) in a predetermined direction, upon application of a vertical electric field in the thickness direction (normal to the substrate surface) of a liquid crystal cell. A user of a liquid crystal element adopting such a display mode looks at the heads or abdomens of liquid crystal molecules depending upon a view direction (angle) of a display screen. Therefore, retardation greatly changes with a viewing direction so that the characteristics of viewing angle is not good, such as a low contrast and a color change.

In order to improve the characteristics, methods have been proposed by which the alignment of liquid crystal molecules is not controlled by a vertical electric field, but by a horizontal electric field (parallel to the substrate surface).

One of these methods is disclosed, for example, in "Principles and Characteristics of Electro-Optical Behavior with In-Plane Switching Mode", by M. Oh-e, M. Ohta, S. Aratani, and K. Kondo, Conf. Record of 1995 IDRC (Asia Display) at page 577, and in the paper by M. Ohta, M. Oh-e, and K. Kondo, Conf. Record of 1995 IDRC (Asia Display) at page 707, which are incorporated herein by reference.

According to the method disclosed in the former document, as shown in FIG. 2B, the alignment of liquid crystals 12 is changed by applying an electric field E in the horizontal direction (parallel to the substrate surface) to a pair of electrodes 13 mounted on one side of a substrate 11. In the uniaxial alignment state of liquid crystal molecules shown in FIG. 2A, linearly polarized light entered the cell from a polarizer 14 passes through the liquid crystal layer and enters analyzer 15. Since the polarizing direction of the analyzer 15 and that of the linearly polarized light passed through the cell are orthogonal, the cell is in a light interception state.

If the horizontal electric field E is applied, the alignment of liquid crystal molecules at the intermediate region in the thickness direction of the liquid crystal cell changes. Liquid crystal molecules in contact with the substrate rarely change their alignment because of a strong alignment force of the substrate. Upon application of the horizontal electric field E, the alignment changes from the state (without horizontal electric field) that liquid crystal molecules 12 are aligned in a uniaxial direction over the whole thickness as shown in FIG. 2A to the state (with horizontal electric field) that liquid crystal molecules 12 are twisted in the intermediate range of the cell in the depth direction.

In the liquid crystal alignment state shown in FIG. 2B, linearly polarized light entered the cell from the polarizer 14 and passed through the liquid crystal layer becomes elliptically polarized light. Light components matching the polarization direction of the analyzer 15 pass and the cell becomes in a light transmission state.

With the horizontal electric field driving method shown in FIGS. 2A and 2B, an image can be displayed with the characteristics having a very wide angle of view. With this display mode, however, sharpness of a transmittance change with an applied voltage is poor so that it is desired to use this mode with active elements such as TFT.

A so-called rubbing method of rubbing the glass substrates sandwiching the liquid crystal layer in one direction with cotton cloth or the like is widely used as a method of positively forming an alignment or orientation structure for liquid crystal molecules. The substrates of liquid crystal cells of a horizontal electric field driving type disclosed in the above document are also rubbed.

Rubbing provides mechanical friction and this friction generates electrostatic charges. If substrates formed on their surface with wirings and active elements such as TFT (thin film transistors) and MIM (metal insulator metal) are rubbed, electrostatic charges generated by the rubbing may break elements or wirings and lower the electric characteristics.

The surface of a substrate formed with elements such as TFT and MIM is very irregular, and it is difficult to obtain a uniform alignment process.

Furthermore, as being different from the vertical electrical field driving method, the horizontal electric field driving method is not necessary to impart pre-tilt to liquid crystal molecules. Rather, a higher contrast display can be obtained without pre-tilt. However, the positive alignment process such as rubbing generally imparts pre-tilt to liquid crystal molecules. In order to perform rubbing without imparting pre-tilt, it is necessary to use a specific alignment film material.

Still further, the horizontal electric field driving method results in a relatively high driving voltage (about 7 V) and a slower response than general TN type liquid crystal display elements.

SUMMARY OF THE INVENTION

It is an object of the present invention to provide a liquid crystal display element of the horizontal electric field driving type and its manufacture, capable of eliminating elements deterioration and breakage during rubbing, operating at a low voltage, and being excellent in the viewing angle characteristics and the response characteristics.

According to one aspect of the present invention, there is provided a liquid crystal display element comprising: a pair of substrates facing each other; a liquid crystal layer sandwiched between the pair of substrates; means for applying an electric field to the liquid crystal layer, the electric field being substantially parallel to surfaces of the pair of substrates; and an alignment structure that an interface of one of the pair of substrates with the liquid crystal layer is not subjected to a positive alignment process and an interface of the other of the pair of substrates with the liquid crystal layer is subjected to the positive alignment process, wherein the alignment state of liquid crystal molecules of the liquid crystal layer is changed between directions both parallel to the surfaces of the pair of substrates.

According to another aspect of the present invention, there is provided a method of manufacturing a liquid crystal display element for controlling an alignment state of liquid crystal molecules in directions parallel to the substrate surface of the liquid crystal display element, comprising the steps of: preparing a substrate having electrodes for applying a horizontal electric field and having on a surface of the substrate a film not subjected to a positive alignment process; preparing a substrate having on a surface of the substrate an alignment structure subjected to a positive alignment process using a predetermined alignment pattern; forming a cell by disposing the two substrates facing each other; and injecting liquid crystal material between the two substrates of the cell and changing the liquid crystal material from the isotropic phase state to a liquid crystal phase state to align liquid crystal molecules.

DETAILED DESCRIPTION OF THE PREFERRED EMBODIMENTS

Figure 1A:
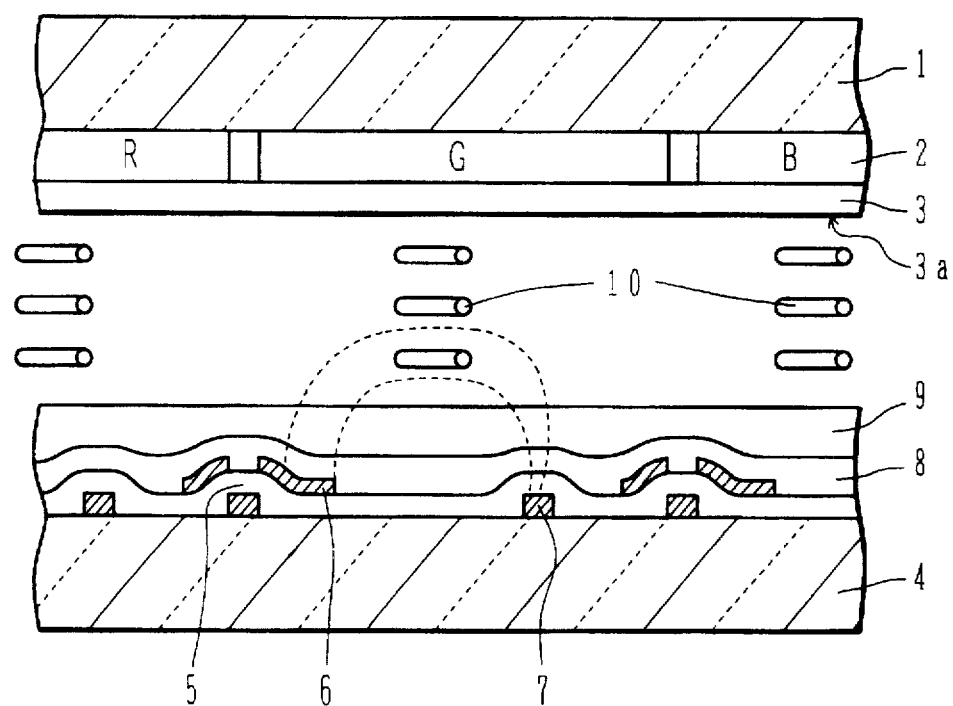
FIG. 1A is a cross sectional view of a liquid crystal cell showing the structure of a liquid crystal display element according to an embodiment of the invention.

With the horizontal electric field (parallel to the substrate surface) driving method according to an embodiment of this invention, a positive alignment process such as rubbing is not performed for one of a pair of substrates of a cell constituting a liquid crystal display element, and it is performed only for the other substrate.

Two substrates, one with the positive alignment process and the other without it, are disposed facing each other, and liquid crystal material is injected into this empty cell. The liquid crystal material is heated to inject it in an isotropic phase, or it is injected in a liquid crystal phase (nematic phase). If it is injected in the liquid crystal phase, the liquid crystal cell after the injection is heated to make the material in a state of isotropic liquid, i.e., in the isotropic phase.

In both the injection methods, the liquid crystal material in the isotropic phase is gradually cooled to change its phase into the liquid crystal state, i.e., into the liquid crystal phase to align liquid crystal molecules. During this alignment process, the alignment of liquid crystal molecules is regulated on the side of the interface between the liquid crystal layer and the substrate subjected to the positive alignment process (rubbing). The alignment of liquid crystal molecules at the interface with the substrate subjected to the positive alignment process propagates to other liquid crystal molecules in the cell, and the liquid crystal molecules at the interface with the other substrate not subjected to the positive alignment process are also aligned by the influence of the liquid crystal molecules aligned in the intermediate region of the cell. For this injection method, reference may be made to U.S. Pat. No. 5,477,356 (issued on Dec. 19, 1995) which is incorporated herein by reference.

In the above manner, even if the substrate with active elements such as TFT and MIM and electrodes is not subjected to the positive alignment process such as rubbing, liquid crystal cells near this substrate can be aligned. The substrate without rubbing does not impart pre-tilt. Even if one of the substrates is applied with the positive alignment process such as rubbing, and imparts pre-tilt, the average pre-tilt of the whole cell is about a half of the conventional pre-tilt amount.

The interface of the liquid crystal layer and the substrate without the positive alignment process has an alignment regulating force (surface energy) weaker than that of the substrate with the positive alignment process. Therefore, if electrodes for applying a horizontal electric field are mounted on this substrate without the positive alignment process, the response characteristics can be improved and a drive voltage can be lowered.

The positive alignment process is not limited to rubbing, but other processes may also be used. For example, as shown in FIG. 1B, an optical alignment film, e.g. a polarization memory film, may be used as the alignment film 3 and polarized light 21 may be applied on the optical alignment film. Alternatively, as shown in FIG. 1C, an optical alignment film may be used as the alignment film 3, and non-polarized light 22 may be applied obliquely on the optical alignment film.

The particular structure of a liquid crystal display element and its manufacture according to the embodiment of this invention will be described with reference to FIG. 1A.

Color filters 2 are formed on the surface of a glass substrate 1. On these color filters 2, an alignment film 3 is formed. In order to obtain a uniform alignment in a predetermined direction over the whole area of the substrate, a rubbing process or an optical alignment process is performed once for the alignment film 3. If a plurality of so-called divided alignment regions having a plurality of different alignment directions such as shown in FIG. 1D are to be formed, a photolithography process for defining each alignment region and a rubbing process are repeated as many times as the number of divided alignment regions having different alignment directions. Alternatively, polarized light is applied through a photomask to an optical alignment film such as a polyvinylcinnamate (PVC) film as many times as necessary, while changing the polarization direction of the polarized light. In the above manner, the surface of the alignment film 3 is provided with an alignment structure 3a.

If the rubbing process is used, liquid crystal molecules are aligned with some pre-tilt angle. This pre-tilt angle can be made small by properly selecting the material of the alignment film 3. For example, if material which aligns the liquid crystal molecules perpendicular to the rubbing direction is selected, the pre-tilt angle can be set to just 0°. A polyimide film of a low pre-tilt type, a polystyrene film, or the like may be used. The optical alignment process does not generate pre-tilt in general cases.

On the surface of the other glass substrate 4, active elements 5 such as TFT, pixel electrode 6 and opposing electrodes 7 for applying a horizontal electric field are formed. On the elements and electrodes, an insulating film 8 is formed, and on this film 8 an alignment film 9 is formed which is not subjected to the alignment process. Although the figure is expanded in thickness direction, the ratio of the distance between the electrodes 6 and 7 to the gap of the cell (thickness of the liquid crystal layer) is far greater than unity, the liquid crystal layer is applied with an electric field substantially parallel to the substrate.

An empty cell is formed by disposing the substrate 1 with the positive alignment process and the substrate 4 without the alignment process at a predetermined gap therebetween to inject liquid crystal material into the empty cell. Nematic liquid crystal is injected in an isotropic state or in a nematic state. A mixture of nematic liquid crystal and chiral agent for causing twist may also be employed. If the liquid crystal cell is injected in the nematic state, the liquid crystal material is once heated to change it to the isotropic state. The liquid crystal material in the isotropic state is gradually cooled to change it to the liquid crystal state to align liquid crystal molecules 10 in predetermined directions by using the influence of the substrate subjected to the alignment process.

Figure 1B:
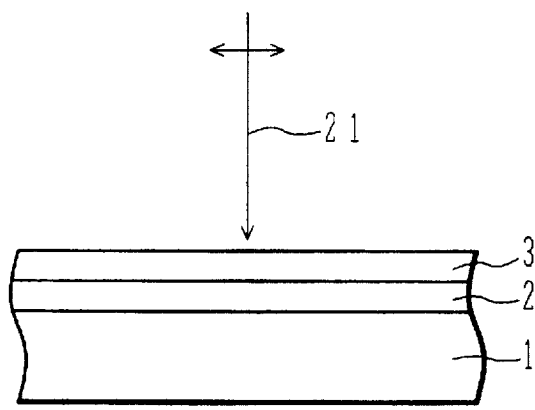
FIGS. 1B to 1D are schematic diagrams showing other alignment processes and an example of an alignment pattern.
Figure 1C:
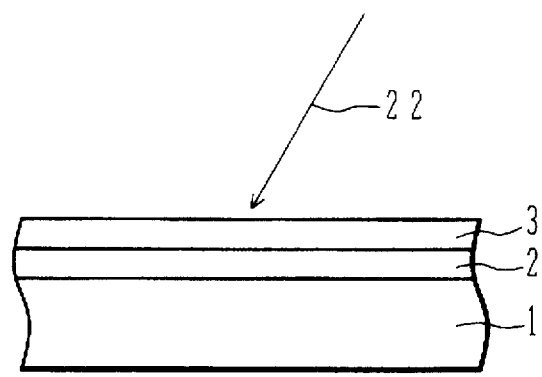
Figure 1D:
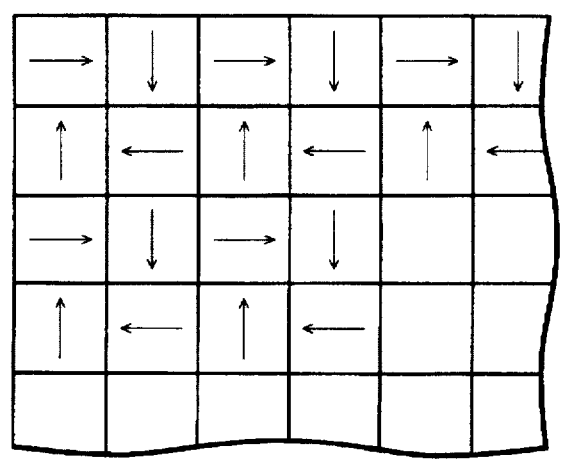
Figure 2B:
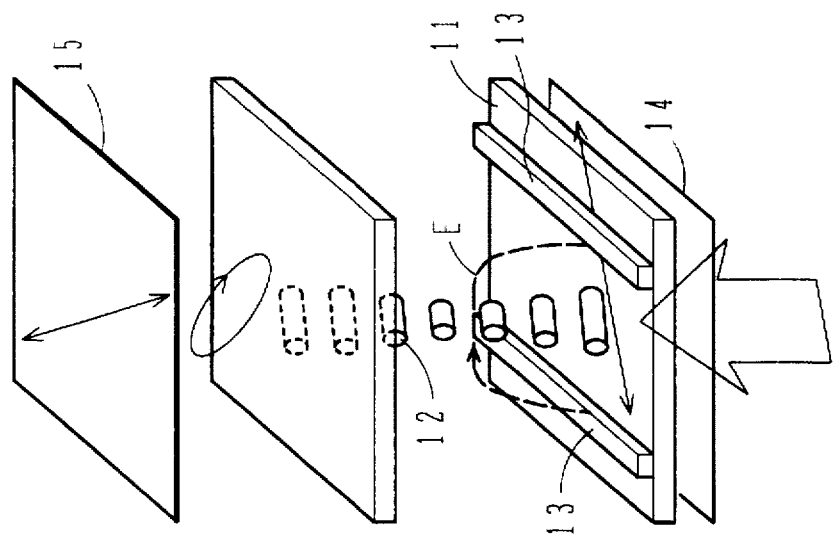
FIGS. 2A and 2B are broken perspective views of a liquid crystal cell illustrating the operation of a liquid crystal display element of a conventional horizontal electric field driving type.
Figure 2A:
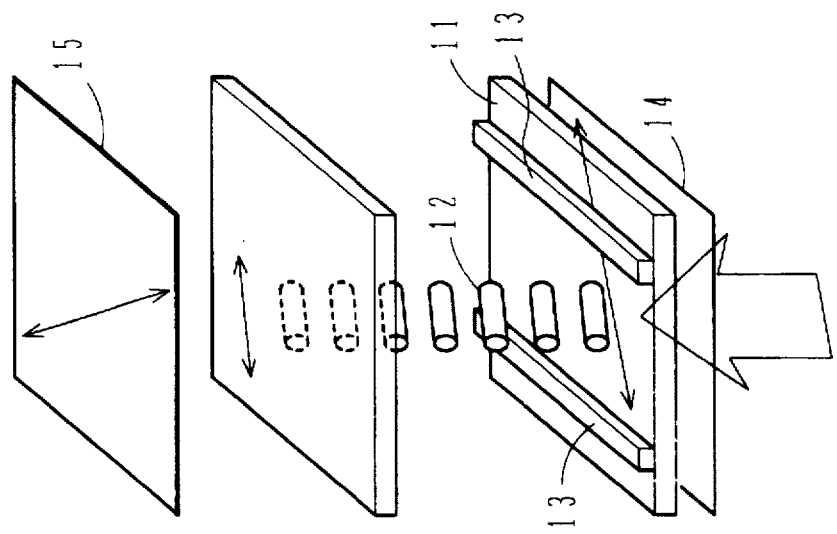

As a voltage is applied between the pixel electrode 6 and opposing electrode 7, a horizontal electric field indicated in FIG. 1A by broken lines is generated in the cell.

The relationship between the alignment direction of liquid crystal, the polarizing directions of a polarizer and an analyzer is the same as that of the liquid crystal display element of the conventional horizontal electric field driving type.

An example of the manufacture of the liquid crystal display element as above will be described next.

As the alignment film 3 on the substrate 1 to be subjected to the alignment process, a polyimide film (SE-510 manufactured by Nissan Kagaku Kogyo) of a low pre-tilt type was used and it was rubbed. On the substrate 4 not to be subjected to the alignment process, a film 9 was formed which has a weak alignment regulation force having the surface energy of about 25 dyn/cm. This film 9 is not subjected at all to the positive alignment process such as rubbing.

In the empty cell formed by disposing these two substrates at a predetermined gap therebetween, a mixture of commonly used fluorine-containing nematic liquid crystal materials (NI point : 98° C.) without any chiral material was injected at an ambient temperature (in liquid crystal phase) through vacuum injection.

The alignment state after the injection was observed and a flow pattern alignment was confirmed. This cell was heated for 30 minutes at 120° C. This heat treatment eliminated disturbance of alignment such as the flow pattern alignment, and a uniform parallel alignment in one direction without any defect was obtained over the whole substrate surface through the whole thickness of the liquid crystal layer.

With this manufacture method, the pre-tilt angle can be set to 0° without a necessity of forming a film of special film material (such as polyimide of a low pre-tilt type) on the substrate not subjected to the alignment process.

In the above embodiment, nematic liquid crystal in the liquid crystal state is injected in the empty cell. Nematic liquid crystal material may be injected in the isotropic phase state. Also in this case, the isotropic phase state is changed to the nematic phase state, by cooling, to align liquid crystal molecules.

Also in the above embodiment, although the rubbing is used as the positive alignment process, the optical alignment process described earlier may be used. In this case, for example a polyvinylcinnamate (PVC) film may be formed on the substrate to be subjected to the alignment process. A polarized light beam may be irradiated on the film in the direction normal to the substrate for several ten seconds to align the PVC film. The cell may be divisionally aligned by changing the polarization direction (alignment direction) of the beam on each pixel or on each alignment region in each pixel, as shown in FIG. 1D. The dielectric anisotropy of injected liquid crystal may be positive or negative. For the formation of a liquid crystal alignment film by light radiation, such as polarization memory film, reference may be made to U.S. Pat. No. 5,479,282 (issued on Dec. 26, 1995), U.S. Pat. No. 5,576,862 (issued on Nov. 19, 1996), and U.S. patent application 08/387,170 (filed on Feb. 13, 1995), which are incorporated herein by reference.

One of the substrates is not subjected to the positive alignment process such as rubbing. Therefore, if the active elements such as TFT and MIM and electrodes and the like are formed on this substrate, element breakages and deteriorations by electrostatic charges can be avoided.

Moreover, since liquid crystal molecules can be aligned without performing the positive alignment process for one of the substrates, even if the surface of this substrate with electrodes and active elements is irregular, a uniform alignment is possible.

The substrate not subjected to the alignment process does not generate pre-tilt without using a special alignment film. Even if pre-tilt is generated by the substrate subjected to the positive alignment process, the average pre-tilt of the whole cell is about a half of the conventional pre-tilt amount. Therefore, a contrast and the viewing angle characteristics can be improved.

In the horizontal electric field driving mode, the pre-tilt angle on the substrate not subjected to the alignment process and formed with electrodes influences the display characteristics greatly. Therefore, the pre-tilt angle of 0° provides considerable effects such as an improved contrast.

Materials which are conventionally difficult to use because of problems of alignment characteristics and the like can be relatively freely used for the substrate not to be subjected to the alignment process. For example, a polyimide film having a low surface energy, a polyvinylalcohol (PVA) film, a polyvinylcinnamate (PVC) film, and the like has a weak alignment regulating force and a low stability of the alignment state given by rubbing or the like. The alignment state on the substrate with electrodes not subjected to the alignment process is determined by the alignment state given by the substrate subjected to the alignment process and the elastic energy of liquid crystal. Therefore, a film of material having a weak alignment regulating force may be formed on the substrate not to be subjected to the alignment process.

If a film having a weak alignment regulating force is formed on the substrate not to be subjected to the positive alignment process, liquid crystal molecules even near at the interface with the substrate become easy to move by the horizontal electric field. Therefore, a threshold value lowers more than conventional cells so that an operation voltage may be lowered or the rise response may be improved. For example, the operating voltage could be lowered to about 6 V when a polyimide film having a surface energy of about 25 dyn/cm was formed on the substrate not to be subjected to the alignment process.

The materials and values in the above description are only illustrative, and the invention is not limited only to the embodiment described above. Obviously, the person skilled in the art can make various modifications and changes based upon the above disclosure.

The techniques of this invention is applicable not only to liquid crystal display elements but also to other liquid crystal related devices and components.

I claim:

1. A liquid crystal display element comprising:
a pair of substrates facing each other;
a liquid crystal layer sandwiched between the pair of substrates;

means for applying an electric field to the liquid crystal layer, the electric field being substantially parallel to surfaces of the pair of substrates; and an alignment structure that an interface of one of the substrates with the liquid crystal layer is not subjected to a positive alignment process and an interface of the other one of the substrates with the liquid crystal layer is subjected to the positive alignment process, wherein an alignment state of liquid crystal molecules of the liquid crystal layer is changed between directions both parallel to the surfaces of the pair of substrates.

2. A liquid crystal display element according to claim 1, wherein said alignment structure does not substantially impart pre-tilt to said liquid crystal layer.

3. A liquid crystal display element according to claim 1, wherein said alignment structure of said other one of the substrates subjected to the positive alignment process has a plurality of aligned regions having different alignment directions.

4. A liquid crystal display element according to claim 1, wherein a polyimide film is formed at the interface of the liquid crystal layer on said other one of the substrates.

5. A liquid crystal display element according to claim 1, wherein a polyvinylalcohol film is formed at the interface of the liquid crystal layer on said one of the substrates.

6. A liquid crystal display element according to claim 1, wherein a polyvinylcinnamate film is formed at the interface of the liquid crystal layer with said one of the substrates.

7. A liquid crystal display element according to claim 1, wherein said other one of the substrates is not formed with electrodes for applying the electric field.

8. A liquid crystal display element according to claim 1, wherein said one of the substrates is formed with electrodes for applying the electric field.

9. A method of manufacturing a liquid crystal display element for controlling an alignment state of liquid crystal molecules in a direction parallel to the substrate surface of the liquid crystal display element, comprising the steps of:

preparing a substrate having electrodes for applying a horizontal electric field and having on the surface of the substrate a film not subjected to a positive alignment process;

preparing another substrate having on the surface of said another substrate an alignment structure subjected to the positive alignment process using a predetermined alignment pattern;

forming a cell by disposing the two substrates facing each other; and injecting liquid crystal material between the two substrates of the cell and changing the liquid crystal material from an isotropic phase to a liquid crystal phase to align liquid crystal molecules.

10. A method according to claim 9, wherein said injection and alignment step injects the liquid crystal material in the liquid crystal phase, and heats the liquid crystal material to a temperature at which the liquid crystal molecules take the isotropic phase, and thereafter gradually cools the liquid crystal molecules to change to the liquid crystal phase and align the liquid crystal molecules.

11. A method according to claim 9, wherein said injection and alignment step injects the liquid crystal material heated to the isotropic phase, and thereafter gradually cools the liquid crystal molecules to change to the liquid crystal phase and align the liquid crystal molecules.

12. A method according to claim 9, wherein the positive alignment process is performed through rubbing.

13. A method according to claim 12, wherein in said step of preparing said another substrate having on the surface thereof the alignment structure subjected to the positive alignment process, a polyimide film is formed on said another substrate, the polyimide film operating to align liquid crystal molecules in a direction orthogonal to the direction of the rubbing.

14. A method according to claim 9, wherein the liquid crystal material is not added with chiral material.

15. A method according to claim 9, wherein the positive alignment process forms the alignment structure so as not to substantially impart pre-tilt to the liquid crystal molecules.

16. A method according to claim 9, wherein the alignment structure includes a polarization memory film, and the positive alignment process is a process of applying polarized light on the polarization memory film.

17. A method according to claim 9, wherein the alignment structure includes a polarization memory film, and the positive alignment process is a process of obliquely applying non-polarized light on the polarization memory film.

* * * * *

UNITED STATES PATENT AND TRADEMARK OFFICE
CERTIFICATE OF CORRECTION

PATENT NO. : 5,793,459
DATED : August 11, 1998
INVENTOR(S) : Yasuo TOKO

It is certified that error appears in the above-identified patent and that said Letters Patent is hereby corrected as shown below:

On the Title page,

Item [30] "Foreign Application Priority Data", change "Jan. 5, 1996" to --May 1, 1996--.

Column 2, above "Primary Examiner- William L. Sikes", insert --FOREIGN PATENT DOCUMENTS

```
         0 620 472 A1   10/1994   Europe
         0 559 172 A2    9/1993   Europe
         96/11423        4/1996   WIPO
         44 20 585      12/1995   Germany
```

UNITED STATES PATENT AND TRADEMARK OFFICE
CERTIFICATE OF CORRECTION

PATENT NO. : 5,793,459
DATED : August 11, 1998
INVENTOR(S) : Yasuo TOKO

It is certified that error appears in the above-identified patent and that said Letters Patent is hereby corrected as shown below:

insert --OTHER PUBLICATIONS

M. Ohta et al; "Development of Super-TFT-LCD's with In-Plane Switching Display Mode"; 1995; pp. 707-710; ASIA DISPLAY '95.

M. Murata et al; "Alignment of Nematic Liquid Crystal Using Polymide Langmuir-Blodgett Films (II)"; May 1993; pp. 679-682; JPN. J. APPL. PHYS., VOL. 32.

Patent Abstracts of Japan, Vol. 96, No. 12, & JP 08 201828 (Hitachi), 9 August 1996.--

Signed and Sealed this

Twenty-sixth Day of October, 1999

*Attest:*

Q. TODD DICKINSON

*Attesting Officer*    *Acting Commissioner of Patents and Trademarks*